TAHIR M. MANSOUR
INVENTOR

BY John R. Faulkner
Jerry D. Beck
ATTORNEYS

United States Patent Office 3,427,110
Patented Feb. 11, 1969

3,427,110
METHOD FOR INSPECTING OBJECTS HAVING PARALLEL FACES
Tahir M. Mansour, Livonia, Mich., assignor to Ford Motor Company, Dearborn, Mich., a corporation of Delaware
Filed Sept. 1, 1964, Ser. No. 393,661
U.S. Cl. 356—239                3 Claims
Int. Cl. G01n 21/16, 21/30, 21/32

ABSTRACT OF THE DISCLOSURE

A method of rejecting a radiation transparent object when a defect in the object causes refraction of the radiation passing therethrough more than a predetermined amount has the following steps. A beam of radiation is projected through the object and a portion of the beam is collected after its passage through the object. A first radiation intensity value signal is produced from the collected beam which is an integral value representative of the average radiation passing through the object. A second radiation intensity value signal is produced from the collected beam which is a differential value representative of the radiation passing through the object at a particular time. The object is rejected as having a defect therein if the differential radiation intensity value is substantially different from the integral radiation intensity value.

---

This invention relates to a method for inspecting transparent objects with parallel faces for defects on the surface of or within the objects themselves.

Until recently, inspection of transparent sheets of glass to evaluate their optical quality had been performed visually. In the mass production of automotive, architectural or similar glass, for instance, visual methods are slow and tedious and are not very reliable as they depend on the subjective visual evaluation of the inspector.

During recent years, photometric systems have been developed to simulate with instrumentation the visual reaction of the inspector to optical defects, thus eliminating the inherent limitation of human judgment and also facilitating high-speed inspection.

An inspection procedure for determining defects of waves or undulations in the surfaces of glass sheets has become commercially feasible. This method, which is subject of U.S. Patent 3,222,024, issued May 30, 1967, and assigned to the assignee of this application, utilizes one or more beams of light and two or more light detecting units for receiving the beams of light after they have passed through the sheet of glass that is being inspected. The light detecting units are spaced and orientated so as to measure the ratio of intensity of adjacent light and dark bands in a shadowgraph pattern generated by the light beams. The bands are created by the wave defects in the glass as the beams of light are refracted in different directions as they pass through the defect area.

The present invention pertains to a method for measuring defects in a transparent object by relating the ratio of maximum or minimum light intensity of the defect image, a differential value, to the average background light intensity of the projected pattern, an integrated value. This is accomplished in a preferred embodiment of this invention by providing a radiant energy source which continuously and uniformly irradiates an area of the transparent object being inspected. A radiant energy sensitive device, which is located on the other side of the transparent object, receives a portion of the radiant energy transmitted through the object over a prescribed area of the object. This portion represents the average or integrated background radiant energy intensity. If there are defects in the irradiated area, a smaller or larger portion of radiant energy will be received upon the radiant energy sensitive device during a time interval when the small defective area is covered by the beam of radiation. This is due to the refraction of the radiant energy waves by the defects in the object being inspected for the short period of time that the defect is engaged by the radiant energy. The amount of radiant energy received over a reduced time interval representative of a reduced glass area will be directly related to the degree and type of defects in the object and is a differential value of radiant energy intensity.

To evaluate the defects in the object, the resultant signal from the radiant energy sensitive device is routed to ratio computing means as known in the electronic art which, in turn, is connected to a display means. The reading displayed on the display means represents the ratio of the maximum or minimum intensity, or differential value, of the radiant energy waves at the defect image to the average background intensity, or integrated value. The deviation of this ratio from unity varies proportionally with the objectional reaction from visual observation. If the displayed reading exceeds a predetermined standard selected so as to correspond with the type of defect for which the transparent object is being inspected, then the object is subject to rejection. The inspection procedure of this invention, which requires continuous scanning of the object, is especially effective for measurement of localized defects such as ream or seeds in plate or sheet glass.

Accordingly, the principal object of this invention is to provide a method for inspecting transparent objects that establishes uniform results.

Another object of this invention is to detect such defects as ream or seeds in plate or sheet glass and to indicate the degree of defects on a display means.

A further object of this invention is to provide a low-cost method for the rapid inspection of sheets of glass.

Other objects and advantages of this invention will become more apparent when read in conjunction with the drawings in which.

Figure 1:
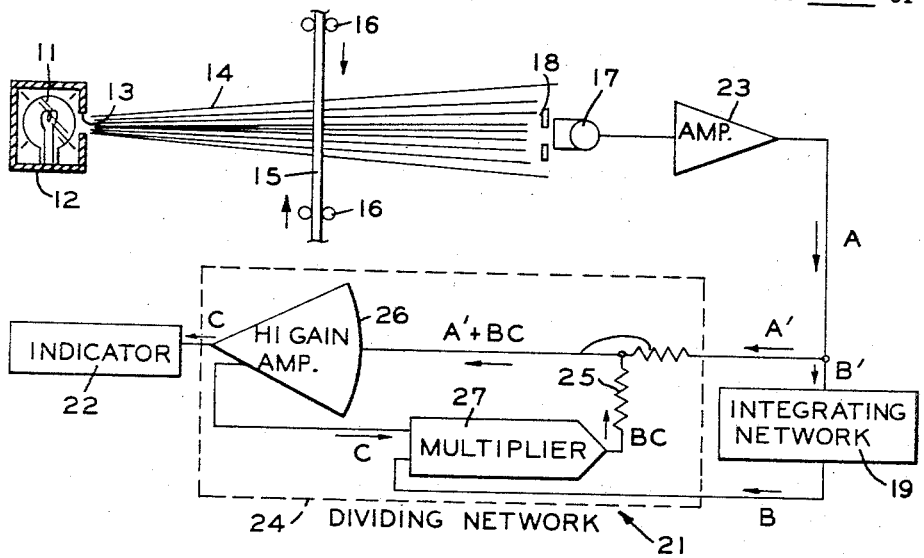
FIGURE 1 is a schematic diagram of a photometric inspection system of one embodiment of this invention in which rays of light employed in the system are depicted as not being displaced by defects in the object being inspected.

In FIGURE 1 can be seen a light source 11 contained in a housing 12 that is provided with an aperture 13. This light source 11 transmits concentrated rays of light 14 with a uniform intensity through a transparent object 15 having substantially parallel faces. The object 15, either a sheet of glass or plastic subject to inspection, may be carried on a support such as a conveying means 16 along a definite path in either direction as indicated by the arrows.

An alternate arrangement may be provided for maintaining the object 15 stationary and moving the inspection apparatus if desired. Also, a collimated beam type of light source or other types of radiant energy sources may be used to uniformly irradiate a portion of the surface area of the transparent object 15.

A light sensitive device 17, such as a photodetector tube, is positioned so that its light sensitive surface is generally perpendicularly orientated with respect to the rays of light 14 after these rays have been transmitted through the transparent object 15. Thus, the light sensitive device 17 is disposed behind the transparent object 15 on the opposite side of the light source 11 and within the generated shadowgraph pattern of the area of the transparent object 15 illuminated by the rays of light 14. A shield 18 is placed in front of the light sensitive surface of the light sensitive device 17 to reduce the influx of stray light rays not irradiating from the light source 11. If the scanned, irradiated area of the object 15 contains very minor or no defects, the rays of light will remain substantially undisplaced as seen in FIGURE 1; and, therefore, the light intensity registered by the light sensitive device 17 remains substantially uniform representing an average background light intensity.

Figure 2:
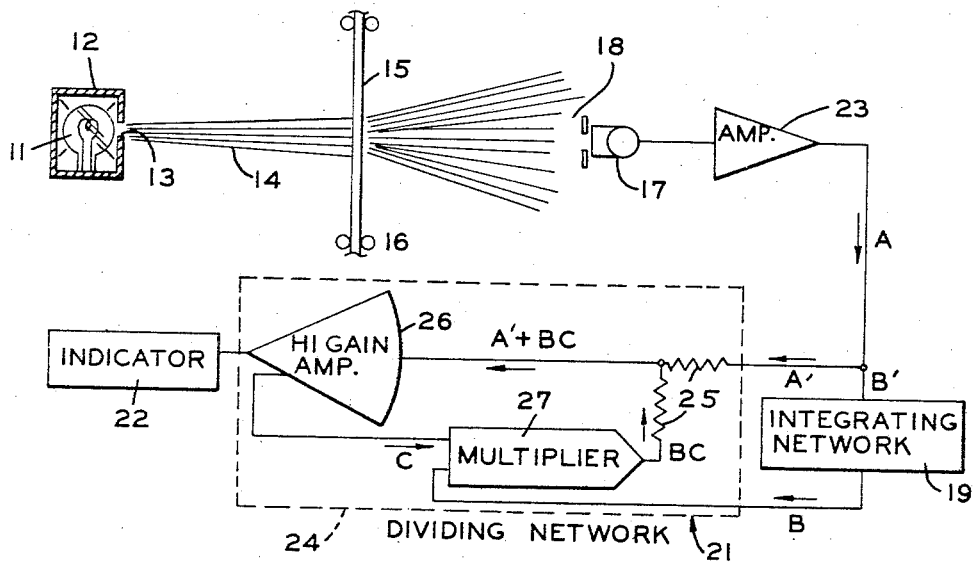
FIGURE 2 is a schematic diagram of the inspection system shown in FIGURE 1 but with the rays of light depicted as being displaced by defects in the object.

When defects occur in the area of the transparent object 15 being scanned, some of the rays of light 14 will be refracted to decrease or increase, for a short period of time for which the light is passing through the small defective area, the light intensity registered on the light sensitive surface of the light sensitive device 17 as best seen in FIGURE 2. The resultant signal from the light sensitive device 17 is routed in part to an integrating network 19 whose output along with the remaining portion of the original signal is fed into a ratio computing device 21 connected to an indicator 22 or other display means. Then the ratio signal from the ratio computing device 21 is calibrated to determine the severity of the defects that occur in the irradiated area of the transparent object 15 being inspected.

The conventional circuitry to accomplish the ratio computing steps is shown in FIGURES 1 and 2. It includes an amplifier 23 that amplifies the signal registered by the photodetector tube or light sensitive device 17. The amplified signal A is subdivided into two portions, A' and B'. The B' portion of the signal is fed into the integrating network 19 such as a low pass R-C filter whose output B is the average of B'. The signal B is, of course, the integrated value of the light intensity incident upon the photodetector tube for a prescribed area of glass determined by the time constant of the R-C filter. The signal A is, of course, the differential value of light intensity incident upon the photodetector tube for a reduced area of glass substantially less than the prescribed area of glass. Signals A' and B are then fed into the ratio computing device 21 which, in this illustrated embodiment, is a dividing network 24 so as to obtain the quotient A'/B. The dividing network 24 is composed of resistances 25, a high gain amplifier 26, and a quarter-square type multiplier 27. The inputs of the multiplier 27 are the divisor signal B and the output C of amplifier 26, and the output of the multiplier 27 is, therefore, BC. The final output of the high gain amplifier 26 is $$C = -K(A' + BC), \text{ which equals}$$

$$C = \frac{-KA'}{1 + KB}$$

where K is the amplification factor of the high gain amplifier 26

As K is very large, $C = -A/B$

Thus, the reading obtained on the indicator 22 is the ratio of the maximum or minimum light intensities, or differential value, at the defect image (—A') to the average background intensity (B), or integrated value.

For certain types of defects, it might be difficult to obtain an average background light intensity, or integrated value, and maximum or minimum intensity signals or differential values, with only one light detecting unit. For this reason, a second embodiment which is shown schematically in FIGURE 3 has been developed. In describing the second embodiment, the same numbers have been applied to elements similar in function and structure to the elements shown in the first embodiment.

Figure 3:
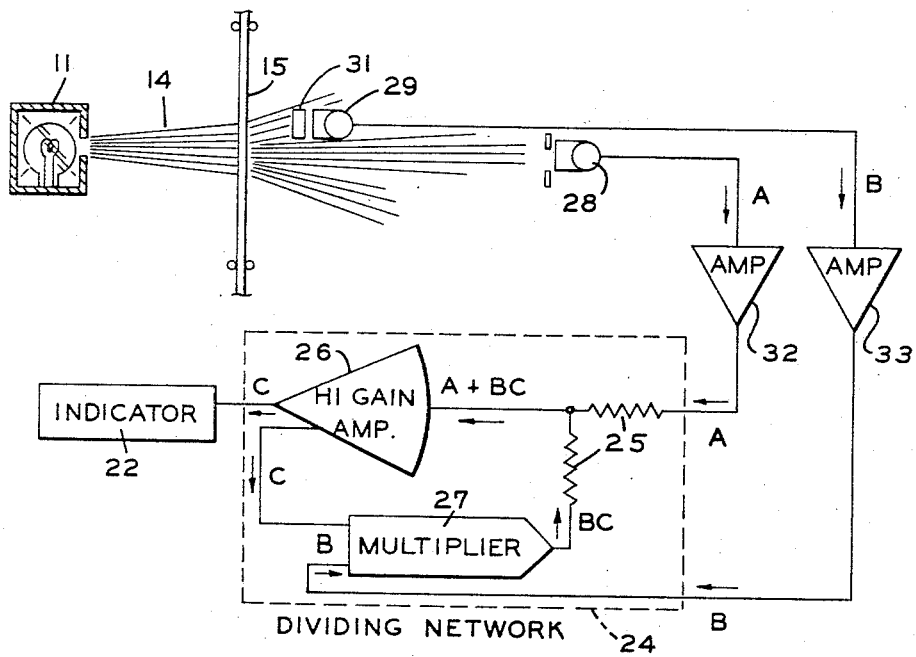
FIGURE 3 is a schematic diagram of a photometric system of the second embodiment of this invention; and, FIGURE 4 is a front elevational view of a shadowgraph pattern generated by the rays of light employed in the photometric system of FIGURE 3 that also depicts the orientation of detection devices positioned within this pattern.
Figure 4:
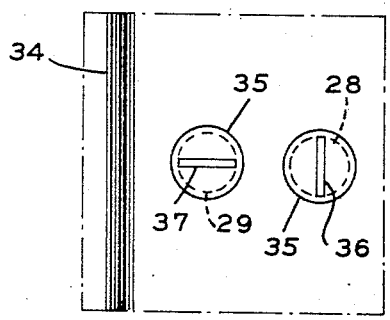

In FIGURE 3 a first light sensitive device 28, such as a photodetector tube, is shown positioned in the generated shadowgraph pattern of the area irradiated by the rays of light 14. A second light sensitive device 29 is also disposed in the shadowgraph pattern, but it is employed in a manner which makes it insensitive to localized variations, or differeatial variations, in intensity caused by minor defects in the object being inspected. This is achieved either by placing a light diffusor 31 in front of the light sensitive device 29 as seen in FIGURE 3 or by orientating or sizing the light sensitive device 29 with respect to the size and orientation of the defect to be evaluated as seen in FIGURE 4 and which will be hereinafter discussed in greater detail.

In FIGURE 3 the light sensitive device 29 or photodetector tube is shown positioned in very close proximity to the transparent object 15 being inspected. A light diffusor 31, such a as neutral density filter, and the placement of the photodetector tube close to the object 15 render this photodetector tube insensitive to light refraction caused by localized or differential optical defects in the object 15.

It is desirable to select a light diffusor that will also attenuate the intensity of the light rays to allow the light sensitive device 29 to transmit a signal equal in magnitude to the signal transmitted by the light sensitive device 28 when no transparent object 15 is disposed between the light source 11 and the light sensitive devices 28 and 29. This will make the reference signal (B) of the light sensitive device 29 proportional to the average intensity or integrated intensity of the light in the plane of the light sensitive device 28 so as to permit the detection of defects in the transparent object 15 when the latter is continuously scanned by the photometric system of the second embodiment of this invention.

As signals A and B are distinct, each signal is amplified by amplifier 32 and amplifier 33, respectively. Then the differential signal A and the integrated signal B are routed directly from the amplifiers 32 and 33 to the dividing network 24 without requiring a portion of the signal to be routed through an integrating network as is necessary when only one photocell is used as disclosed in the first embodiment. The dividing network 24 in FIGURE 3 is constructed to function in the same manner as the dividing network 24 previously discussed in conjunction with FIGURES 1 and 2 to obtain the ratio —A/B on the indicator 22.

FIGURE 4 illustrates a specific application of the second embodiment of this invention to evaluate a defect known as "ream" in a continuous sheet of glass. The ream defect has been defined as a very thin stria of glass, usually of notable length, included within the body of the glass which has an effective index of refraction which differs from that of the enveloping glass.

A typical generated shadowgraph pattern to illustrate ream is seen in FIGURE 4. A band designated as 34 is the image of the ream defect and is readily identified as it is unidirectional, thin (as thin as .03 inch for instance) and clearly detectable due to the difference of light intensity from adjacent areas.

To evaluate the ream defect, the apparatus of FIGURE 3 is modified by removing the light diffusor 31, relocating the light sensitive devices into the same plane, and placing a cover 35 provided with long, narrow slit 36 having an opening of .05 inch x .80 inch in front of the first light sensitive device 28 with the main axis of the slit parallel to the ream image axis for proper image resolution. The light sensitive device 29 has a similar cover 35 with a slit 37, but the slit 37 is positioned perpendicularly to the ream image axis so as to substantially ignore the ream effect.

As the projected ream image will only cover a very small percentage of the slit 37 at one time, the light intensity received by the light sensitive device 29 will not be affected to any extent and will be an integrated value of intensity. But, when the ream image passes across slit 36, its characteristic intensity will be adequately resolved and registered by the light sensitive device 28 to produce a sharp change in the differential signal. The computed ratio of the signals (A and B) transmitted by the light sensitive devices 28 and 29 are displayed on the indicator 22 in the same manner as heretofore described.

In the specific application of the method of this invention for the detection of ream, a distance of 48 inches was established between the light source 11 and the light sensitive devices 28 and 29. The transparent object 15 being inspected for ream was placed 24 inches from the light source 11. These distances were selected to achieve sufficient magnification and sharpness of the defect image and are illustrative for ream detection only. A correlation plot has shown that a definite relationship exists between the visual rating of the ream defect and the instrumental ream definition. The results obtained by employing the method of this invention are more reliable and uniform than heretofore obtained by visual methods.

A point light source is usually preferred for the measurement of small localized defects such as ream, orange peel, seeds, blisters, etc., in sheet, plate, or float glass, although a collimated beam light source may also be utilized. The distance between the light source 11 and the light sensitive devices 28 and 29 depend largely upon the nature and the size of the general defect category to be measured.

The method of the first and second embodiments of this invention can also be readily applied to the inspection and evaluation of other defects in glass or other transparent media and to surface irregularities on opaque, specularly reflecting media. In the method of inspection, the change from one defect category to another may require the modification of the geometry of the light sensitive devices and/or the distance between the light source and the light detecting devices and their orientation for optimum defect image generation and resolution.

It will be understood that various modifications may be made without departing from the spirit and scope of the invention as defined in the appended claims.

I claim:
1. A method of rejecting a radiation transparent object when a defect therein causing refraction of the radiation passing therethrough refracts the radiation more than a predetermined amount, which method comprises the steps of:
   projecting a beam of radiation energy at said object;
   detecting a first portion of said beam of radiation passing through said object; and
   producing a radiation intensity value signal from said first portion of said beam which is representative of the average radiation passing through said object over a predetermined area thereby to obtain an integral value of radiation intensity for said object;
   detecting a second portion of said beam of radiation passing through said object; and
   producing a radiation intensity value signal from said second portion of said beam which is representative of the radiation energy passing through an area of said object smaller than said predetermined area thereby to obtain a differential value of radiation intensity for said object; and
   rejecting said object as having a defect therein which causes more than a predetermined refraction of said radiation when said differential value of radiation intensity is substantially different from said integral value of radiation intensity when said two values are compared.

2. The method of claim 1 wherein said beam of radiation energy is light energy and wherein said radiation transparent object is glass.

3. A method of rejecting a light transparent object when a defect therein causing refraction of light passing therethrough refracts the light more than a predetermined amount, which method comprises the steps of:
   projecting a beam of light energy at said object;
   detecting a first portion of the light of said beam passing through a predetermined area of the object;
   collecting a second portion of said beam of light passing through an area of said object smaller than said predetermined area of said object;
   producing a radiation intensity value signal from said first portion of said beam of light which is representative of the average radiation passing through said object over said predetermined area thereby to obtain an integral value of radiation intensity;
   producing a radiation intensity value signal from said second portion of said beam of light which is representative of the radiation energy passing through said smaller area of said object thereby to obtain a differential value of radiation intensity; and
   rejecting said object as having a defect therein which causes more than a predetermined refraction of said light beam when said differential value of radiation intensity is substantially different from said integral value of radiation intensity when said two values are compared.

References Cited

UNITED STATES PATENTS 3,322,024  5/1967  Preston _____ 88—14
3,069,964  12/1962  Simon _____ 88—14

JEWELL H. PEDERSEN, *Primary Examiner.*

O. B. CHEW, *Assistant Examiner.*

U.S. Cl. X.R.

250—219; 356—200